United States Patent
Hoppe et al.

(10) Patent No.: US 7,619,623 B2
(45) Date of Patent: Nov. 17, 2009

(54) PERFECT MULTIDIMENSIONAL SPATIAL HASHING

(75) Inventors: Hugues H. Hoppe, Redmond, WA (US); Sylvain Lefebvre, La Fouillouse (FR)

(73) Assignee: Microsoft Corporation, Redmond, WA (US)

( * ) Notice: Subject to any disclaimer, the term of this patent is extended or adjusted under 35 U.S.C. 154(b) by 374 days.

(21) Appl. No.: 11/405,953

(22) Filed: Apr. 17, 2006

(65) Prior Publication Data
US 2007/0244850 A1   Oct. 18, 2007

(51) Int. Cl.
G06T 15/00   (2006.01)

(52) U.S. Cl. ..................................... 345/419
(58) Field of Classification Search ............. 345/419
See application file for complete search history.

(56) References Cited

U.S. PATENT DOCUMENTS

| | | | | |
|---|---|---|---|---|
| 6,014,733 | A * | 1/2000 | Bennett | 711/216 |
| 6,513,041 | B2 * | 1/2003 | Tarin | 707/10 |
| 6,633,297 | B2 * | 10/2003 | McCormack et al. | 345/506 |
| 2003/0128876 | A1 * | 7/2003 | Yamaguchi | 382/190 |

OTHER PUBLICATIONS

Indyk, P., Motwani, R., Vempala, S., Raghavan, P., Locality-Preserving Hashing in Multidimensional Spaces, May 1997, ACM, Proceedings of the twenty-ninth annual ACM symposium on theory of computing, pp. 618-625.*

Benson et al., "Octree Textures", ACM, 2002, pp. 785-790, Jul. 2002.

Czech, et al., "Fundamental Study Perfect Hashing", Theoretical Computer Schience 182 (1997), pp. 1-143, Aug. 1997.

Fox, et al., "Practical Minimal Perfect Hash Functions for Large Databases", Communications of ACM, Jan. 1992, vol. 35., No. pp. 105-121..pdf.

Lefebvre et al., "Octree Textures on the GPU", pp. 597-615, Mar. 2005.

Kraus, et al., "Adaptive Texture Maps", The Eurographics Association, 2002, pp. 7-15 and 153, Sep. 2002.

Kniss, et al, "Octree Textures on Graphics Hardware", one page, Jul. 2005.

* cited by examiner

*Primary Examiner*—Ulka Chauhan
*Assistant Examiner*—Said Broome
(74) *Attorney, Agent, or Firm*—Klarquist Sparkman, LLP (57) ABSTRACT

A multidimensional hash table is created based on a data source having sparse multidimensional data. The sparse source data is mapped into the hash table using a hash function. The hash function can be defined by accessing multidimensional values in an offset table. The offset values in the offset table can be precomputed from the static source data so as to avoid hash collisions, thus creating a perfect hash function. Additionally, the perfect hash function is designed to preserve spatial coherence of accesses, so as to improve locality of memory reference.

18 Claims, 4 Drawing Sheets
(3 of 4 Drawing Sheet(s) Filed in Color)

Software 780 Implementing the Described Methods for Perfect Multidimensional Spatial Hashing

Figure 7

PERFECT MULTIDIMENSIONAL SPATIAL HASHING

FIELD

The disclosed technology relates to graphics applications, more specifically to graphics applications involving sparsely defined spatial data.

BACKGROUND

Many graphics applications involve sparsely defined spatial data. For example, image discontinuities such as sharp vector silhouettes are generally present at only a small fraction of pixels. Texture sprites often overlay high-resolution features at sparse locations. Image attributes such as alpha masks are mainly binary, requiring additional resolution at only a small subset of pixels. Surface texture or geometry can be represented as sparse 3D data.

Compressing such sparse data while retaining efficient random-access is a challenging problem. Current solutions include the following:

- Data quantization is lossy and uses memory at all pixels even though the vast majority may not have defined data.
- Block-based indirection tables typically have many unused entries in both the indirection table and the blocks.
- Intra-block data compression (including vector quantization) uses fixed-length encodings for fast random access.
- Quadtree/octree structures contain unused entries throughout their hierarchies, and moreover require a costly sequence of pointer indirections.

Such solutions, however, incur significant memory overhead.

Perfect Hashing

A perfect hash usually refers to a hash function that maps elements into a hash table without any collisions. Generally, all the elements map to distinct slots of the hash table. The probability that randomly assigning n elements in a table of size m results in a perfect hash is $$Pr_{PH}(n, m) = (1) \cdot \left(1 - \frac{1}{m}\right) \cdot \left(1 - \frac{2}{m}\right) \ldots \left(1 - \frac{n-1}{m}\right).$$

When the table is large (i.e., m>>n) one can use the approximation $e^x \cong 1+x$ for small x to obtain $$Pr_{PH}(n, m) \cong 1 \cdot e^{-1/m} \cdot e^{-2/m} \ldots e^{-(n-1)/m}$$
$$= e^{-(1+2+\ldots+(n-1))/m}$$
$$= e^{-(n(n-1)/2m)}$$
$$\cong e^{-n^2/2m}.$$

Thus, the presence of a hash collision is highly likely when the table size m is much less than $n^2$. This is an instance of the well-known "birthday paradox" (e.g., a group of only 23 people have more than 50% chance of having at least one shared birthday).

The probability of finding a minimal perfect hash (e.g., where n=m) is $$Pr_{PH}(n) = \left(\frac{n}{n}\right) \cdot \left(\frac{n-1}{n}\right) \cdot \left(\frac{n-2}{n}\right) \ldots \left(\frac{1}{n}\right)$$
$$= \frac{n!}{n^n}$$
$$= e^{(\log n! - n \log n)}$$
$$\cong e^{((n \log n - n) - n \log n)}$$
$$= e^{-n},$$

which uses Stirling's approximation $\log n! \cong n \log n - n$. Therefore, the expected number of bits needed to describe these rare minimal perfect hash functions is intuitively $$\log_2 \frac{1}{Pr_{PH}(n)} \cong \log_2 e^n = (\log_2 e)n \cong (1.443)n.$$

Several number-theoretical methods construct perfect hash functions by exploiting the Chinese remainder theorem. However, even for sets of a few dozen elements, these functions involve integer coefficients with hundreds of digits.

A more computer-amenable approach is to define the hash using one or more auxiliary tables. One approach uses three such tables and two nested hash functions to hash a sparse set of n integers taken from $\mathbb{Z}_u = \{0 \ldots, u-1\}$. Such a scheme takes constant time and $3n \log n$ bits of memory. The hash is constructed with a deterministic algorithm that takes O(nu) time. Another approach reduces space complexity to the theoretically optimal $\Theta(n)$ bits, but the constant is large and the algorithm difficult.

Some schemes treat perfect hashing as an instance of sparse matrix compression. They map a bounded range of integers to a 2D matrix and compact the defined entries into a 1D array by translating the matrix rows. Sparse matrix compression is known to be NP-complete.

The most practical schemes achieve compact representations and scale to larger datasets by giving up guarantees of success. These probabilistic constructions may iterate over several random parameters until finding a solution. For example, one scheme defines a hash $h(k)=h_0(k)+g_1[h_1(k)]+g_2[h_2(k)] \bmod m$, where functions $h_0, h_1, h_2$ map string keys k to $\mathbb{Z}_m, \mathbb{Z}_r, \mathbb{Z}_r$ respectively, and $g_1, g_2$ are two tables of size r. However, this algorithm takes expected time $O(r^4)$, and is practical only up to n=512 elements.

Another approach involves creating the first scheme with good average-case performance (~1ln bits) on large datasets. The insight is to assign values of auxiliary tables $g_1, g_2$ in decreasing order of number of dependencies. This approach also describes a second scheme that uses quadratic hashing and adds branching based on a table of binary values. This second scheme achieves ~4n bits for datasets of size $n \sim 10^6$.

Spatial Hashing

Hashing is commonly used for point and region queries in multidimensional databases. Spatial hashing is also used in graphics for efficient collision detection among moving or deforming objects. However, these techniques employ imperfect hashing (e.g., traditional multi-probe hash tables implemented on the CPU).

These techniques do not transition to multidimensional tables. Also, they strive to make intermediate hashes as random as possible. As such, there exists a need for a perfect multidimensional hash function that preserves spatial coherence and thus improves runtime locality of reference.

SUMMARY

The following Detailed Description presents a technique of implementing a perfect multidimensional hash function to densely pack sparse spatial data. The new technique described herein preserves spatial coherence and improves runtime locality of reference by creating a multidimensional hash table, creating a multidimensional offset table, and applying a perfect multidimensional hash function to map sparse multidimensional data into the hash table using the offset table. Implementations of this technique involve precomputing the perfect multidimensional hash function on static data to avoid hash collisions. Numerous graphics applications for this new technique include sharp image silhouettes, texture sprites, alpha channel compression, 3D-parameterized textures, 3D painting, simulation, and collision detection.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. Additional features and advantages of the invention will become more apparent from the following detailed description, which proceeds with reference to the accompanying figures.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION

Exemplary Hashing

The disclosed technology proposes to losslessly pack sparse data into a dense table using a hash function h(p) on position p. Applying traditional hashing algorithms in the context of current graphics architecture presents several challenges:

(1) Iterated probing: To cope with collisions, hashing algorithms typically perform a sequence of probes into the hash table, where the number of probes varies per query. This probing strategy is inefficient in a graphics processing unit (GPU), because SIMD parallelism makes all pixels wait for the worst-case number of probes. While GPUs now have dynamic branching, it is only effective if all pixels in a region follow the same branching path, which is unlikely for hash tests.

(2) Data coherence: Avoiding excessive hash collisions and clustering generally requires a hash function that distributes data seemingly at random throughout the table. Consequently, hash tables often exhibit poor locality of reference, resulting in frequent cache misses and high-latency memory accesses.

Exemplary Perfect Hashing

A perfect hash function (e.g., one that is precomputed for a static set of elements to have no collisions) can make hashing more compatible with GPU parallelism. Desirably, the perfect hash function is a minimal perfect hash function (e.g., one in which the hash table contains no unused entries). The description of a minimal perfect hash function is expected to require a number of bits proportional to the number of data entries. Thus one cannot construct a perfect hash using an expression with a small number of machine-precision parameters. Rather, one must store additional data in auxiliary lookup tables.

The disclosed technology defines a perfect multidimensional hash function of the form $h(p) = h_0(p) + \Phi[h_1(p)]$, which combines two imperfect hash functions $h_0, h_1$ with an offset table $\Phi$. Intuitively, a role of the offset table is to "jitter" the imperfect hash function $h_0$ into a perfect one. Although the offset table uses additional memory, it can fortunately be made significantly smaller than the data itself (e.g., it typically has only 15-25% as many entries, each entry having just 8 bits per coordinate). Implemented on the GPU, this perfect hash allows data access using just one additional texture access plus approximately 4-6 more shader instructions depending on the application scenario.

Exemplary Spatial Coherence

Prior work on perfect hashing has focused on external storage of data records indexed by character strings or sparse integers. No known work has considered multidimensional data and its unique opportunities. Indeed, in computer graphics, 2D and 3D texture data is often accessed coherently by the parallel GPU, and is therefore swizzled, tiled, and cached. Ideally, hashed textures should similarly be designed to exploit access coherence.

Whereas prior work seeks to make intermediate hash functions like $h_0, h_1$ as random as possible, the disclosed technology instead designs them to be spatially coherent, resulting in efficient access into the offset table $\Phi$. Second, the disclosed technology optimizes the offset values in $\Phi$ to maximize coherence of h itself. Creating a perfect hash is already a difficult combinatorial problem. Nonetheless, there remain enough degrees of freedom to improve coherence and thereby increase runtime hashing performance.

Exemplary Sparsity Encoding

In addition to sparse data compaction, the disclosed technology also describes several schemes for encoding the spatial positions of these sparse samples. Specifically, it introduces domain bits, position tags, and parameterized position hashes.

Exemplary Filtering and Blocking

For applications that require continuous local interpolation of the sparse data, two exemplary approaches can be considered. The first is to allow native filtering in the dedicated GPU hardware by grouping the data into sample-bordered blocks. In this setting, the disclosed technology replaces the traditional block indirection table by a compact spatial hash over the sparsely defined blocks. The limiting factor in using blocks is that data must be duplicated along block boundaries, thus discouraging small blocks sizes and leading to memory bloat.

A second exemplary solution attains a more compact representation by forgoing blocking and performing filtering explicitly as general-purpose computation. At present this incurs an appreciable loss in performance but can reduce memory by a factor 3 over blocking schemes.

Two Initial Examples of the Disclosed Technology

Figure 1:
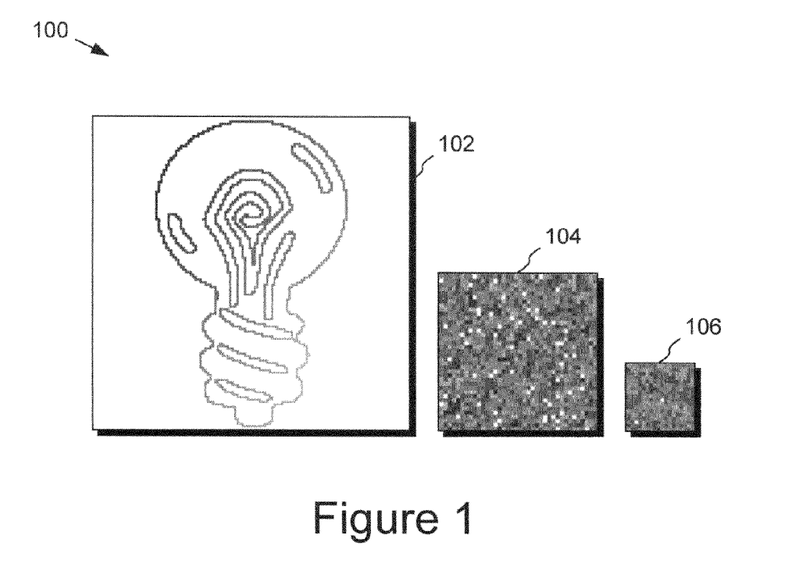
FIG. 1 illustrates a first example of the disclosed technology including an image with sparsely defined pixel data, a 2D hash table, and a 2D offset table.
Figure 2:
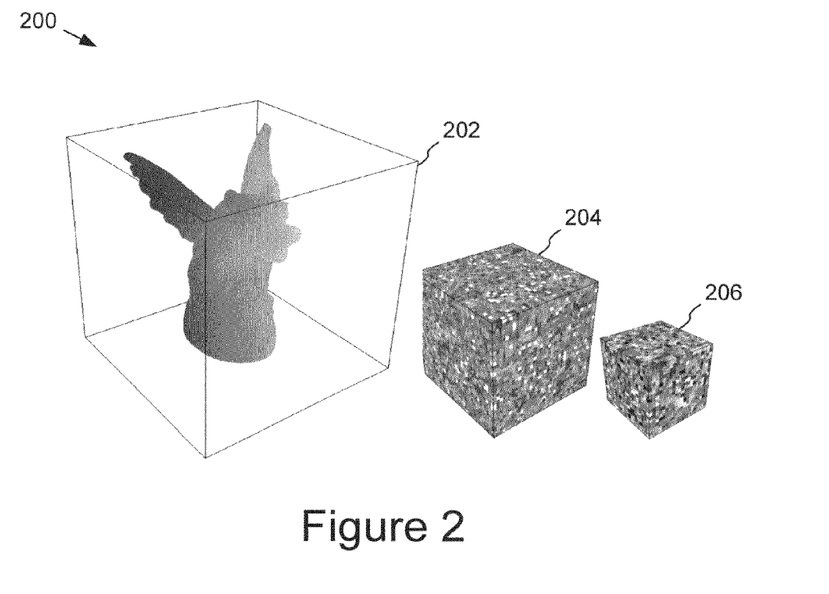
FIG. 2 illustrates a second example of the disclosed technology including a 3D volumetric domain with sparsely defined data, a 3D hash table, and a 3D offset table.

FIGS. 1 and 2 illustrate two coarse examples of the disclosed technology. The domain data values are taken from simple linear color ramps, and the offset table vectors are visualized as colors.

In the 2D example 100, the $128^2$ image 102 contains a set of 1,381 pixels (8.4%) with supplemental information (e.g., vector silhouette data). This sparse pixel data is packed into a hash table 104 of size $38^2=1,444$, which is much smaller than the original image. The perfect hash function is defined using an offset table 106 of size $18^2$.

In the 3D example 200, a triangle mesh is colored by accessing a 3D texture 202 of size $128^3$. Only 41,132 voxels (2.0%) are accessed when rendering the surface using nearest-filtering. These sparse voxels are packed into a 3D table 204 of size $35^3=42,875$ using a $20^3$ offset table 206.

An Exemplary Perfect Hashing Scheme

Exemplary Terminology

Figure 3:
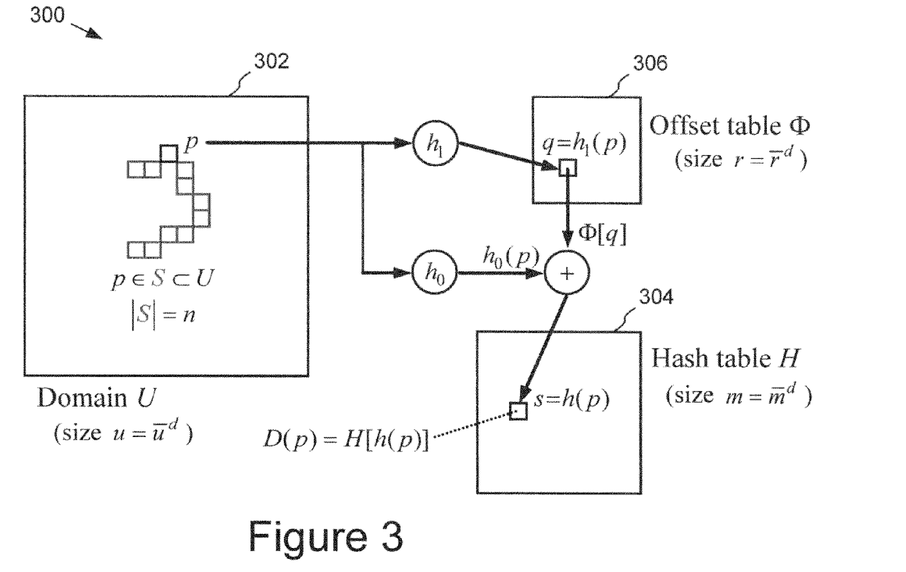
FIG. 3 illustrates an exemplary hash function environment having a spatial domain, a hash table, and an offset table.
Figure 4:
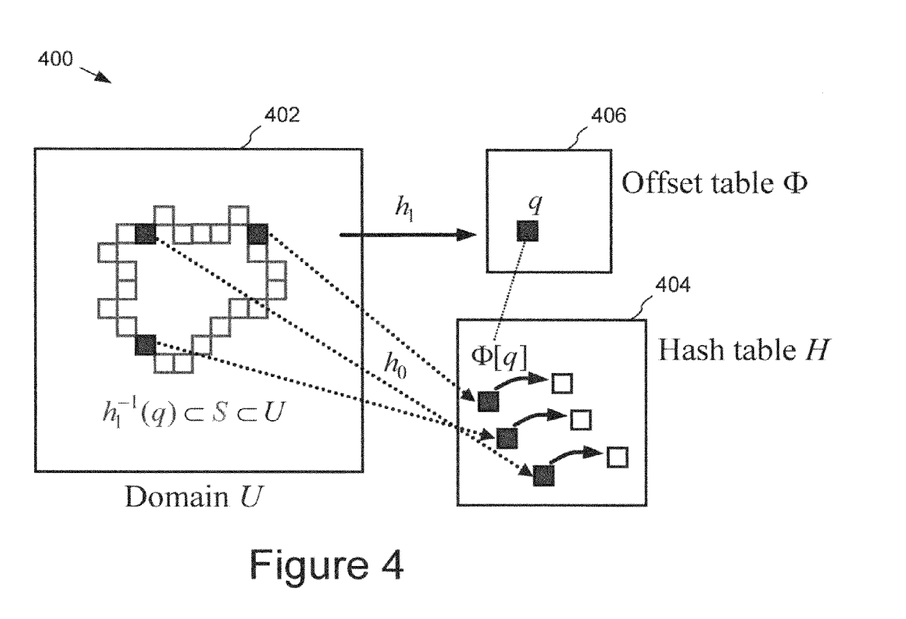
FIG. 4 illustrates another exemplary hash function environment having a spatial domain, a hash table, and an offset table.

FIGS. 3 and 4 illustrate exemplary hash function environments according to the disclosed technology. FIG. 3 illustrates an exemplary hash function environment 300 having a spatial domain U 302, a hash table 304, and an offset table 306. Assuming the spatial domain U 302 to be a d-dimensional grid with $u=\bar{u}^d$ positions, denoted by $\mathbb{Z}_{\bar{u}}^d=[0 \ldots (\bar{u}-1)]^d$, the sparse data consists of a subset $s \subset u$ of n grid positions, where each position p∈S has associated data record D(p). Thus, the data density is the fraction ρ=n/u. For datasets of codimension 1, such as curves in 2D or surfaces in 3D, one typically finds $\rho \sim 1/\bar{u}$.

One goal is to replace the sparsely defined data D(p) by a densely packed hashed texture H[h(p)] where:

the hash table H 304 is a d-dimensional array of size m= $\bar{m}^d \geq n$ containing the data records D(p), p∈S; and the perfect hash function h(p):U→H is an injective map when restricted to S, mapping each position p∈S to a unique slot s=h(p) in the hash table.

As illustrated in FIG. 3, this perfect hash function is formed as $h(p)=h_0(p)+\Phi[h_1(p)] \mod \bar{m}$, where:

the offset table Φ 306 is a d-dimensional array of size r= $\bar{r}^d = \sigma n$ containing d-dim. vectors; the factor σ is usually about 1/(2d);

the map $h_0: p \rightarrow M_0 p \mod \bar{m}$ from domain U 302 onto hash table H 302 is a simple linear transform with a d×d matrix $M_0$, modulo the table size;

the map $h_1: p \rightarrow M_1 p \mod \bar{r}$ from domain U 302 onto the offset table Φ 304 is similarly defined.

In this example, all modulo operations are performed per-coordinate on vectors.

One strategy is to let the hash table 304 be as compact as possible to contain the given data, and then to construct the offset table 306 to be as small as possible while still allowing a perfect hash function.

Exemplary GPU Implementation

An exemplary scheme can be described mathematically using arrays with integer coordinates (e.g., $0, 1, \ldots, \bar{m}-1$) and integer values. These are presently implemented as 2D/3D textures with normalized coordinates (e.g., $0.5/\bar{m}$, $1.5/\bar{m}, \ldots, \bar{m}-0.5/\bar{m}$) and normalized colors (e.g., 0/255, 1/255, ..., 255/255).

Quantizing the offset vectors stored in Φ to 8 bits per coordinate provides enough flexibility for hashing even when the hash table size $\bar{m}$ exceeds $2^8=256$. Therefore, Φ is allowed to be a d-channel 8-bit image. However, to avoid bad clustering during hash construction, it is important to allow the offsets to span the full hash table, so the stored integers $\mathbb{Z}_{256}^d$ are scaled by $\lceil \bar{m}/255 \rceil$.

The following is high-level shading language (HLSL) pseudocode for the exemplary hashing function:

```
static const int d=2;              // spatial dimensions (2 or 3)
typedef vector<float,d> point;
#define tex(s,p) (d==2 ? tex2D(s,p) : tex3D(s,p))
sampler SOffset, SHData; // tables Φ and H.
matrix<float,d,d> M[2]; // M_0,M_1 prescaled by 1/m̄,1/r̄.
point ComputeHash(point p) { // evaluates h(p) → [0,1]^d
    point h0 = mul(M[0],p);
    point h1 = mul(M[1],p);
    point offset = tex(SOffset, h1) * oscale; // (*⌈m̄/255⌉)
    return h0 + offset;
}
float4 HashedTexture(point pf) : COLOR {
    // pf is prescaled into range [0,ū] of space U
    point h = ComputeHash(floor(pf));
    return tex(SHData, h);
}
```

Several optimizations of this code are possible. For 2D domains, the two matrix multiplication mul (M[i], p) can be done in parallel within a float4 tuple. Also, the matrices $M_0, M_1$ are in fact scaled identity matrices, so the matrix multiplications reduce to a single multiply instruction.

Exemplary Hash Construction

In one example, the disclosed technology seeks to assign table sizes $\bar{m}, \bar{r}$, hash coefficients $M_0, M_1$, and offset values in table Φ such that (1) h(p) is a perfect hash function;

(2) Φ and H are as compact as possible; and (3) the accesses to the tables, $\Phi[h_1(p)]$ and H[h(p)], have good coherence with respect to p.

Exemplary Selection of Table Sizes

Assuming a hash table to be a square (d=2) or cube (d=3), its size $\bar{m}$ can be the smallest value such that $m=\bar{m}^d \geq n$. If $\bar{m}>256$, one can slightly increase the table size to $m=\bar{m}^d \geq (1.01)n$ to give enough leeway for a perfect hash. In other embodiments, non-square and non-cube tables may be used.

In the example, the next step is to assign the offset table size $\bar{r}$ to be as small as possible while still permitting a perfect hash. At least two different strategies for selecting $\bar{r}$ can be used, depending on whether the speed of hash construction is important or not.

For fast construction, one can initially set $\bar{r}$ to the smallest integer such that $r=\bar{r}^d \geq \sigma n$ with the factor $\sigma=1/(2d)$. This size corresponds to 4 bits per data entry, and allows a perfect hash in many cases. If the hash construction fails, $\bar{r}$ can be increased in a geometric progression until construction succeeds.

For compact construction, one can perform a binary search over $\bar{r}$. Because the construction is greedy and probabilistic, finding a perfect hash for a given table size $\bar{r}$ may require several attempts, particularly if $\bar{r}$ is close to optimal. In the example, up to 5 such attempts can be made using different random seeds.

Exemplary Selection of Hash Coefficients

One approach is to fill the matrices $M_0, M_1$ (defining the intermediate hash functions $h_0, h_1$) with random prime coefficients. To improve hash coherence, these matrices are sought to be made more regular.

In the example, letting $M_0 M_1$ just be identity matrices does not significantly hinder the construction of a perfect hash. The functions $h_0, h_1$ then simply wrap the spatial domain multiple times over the offset and hash tables, moving over domain points and table entries in lockstep. Thus, the offset table access $\Phi[h_1(p)]$ is perfectly coherent. Although $h_0(p)$ is also coherent, the hash table access $H[h(p)]$ is generally not because it is jittered by the offsets. However, if adjacent offset values in $\Phi$ are the same (e.g., if the offset table is locally constant), then h itself will also be coherent.

One necessary condition on $h_0, h_1$ is that they must map the defined data to distinct pairs. That is, $p \in S \rightarrow (h_0(p), h_1(p))$ must be injective. Indeed, if there were two points $p_1, p_2 \in S$ with $h_0(p_1) = h_0(p_2)$ and $h_1(p_1) = h_1(p_2)$, then these points would always hash to the same slot $h(p_1) = h(p_2)$ regardless of the offset stored in $\Phi[h_1(p_1)]$, making a perfect hash impossible.

The condition for injectivity is similar to a perfect hash of n elements into a table of size $|H| \times |\Phi| = mr$. One can derive a probability of success of $$Pr_{PH} \cong e^{-n^2/(2mr)} \cong e^{-n/2r},$$

which seems ominously low—only 12% for $\sigma = r/n = 0.25$. This could be the main reason that previous perfect hashing schemes resorted to additional tables and hash functions.

However, unlike prior work, the disclosed technology does not involve selecting $h_0, h_1$ to be random functions. Because the functions $h_0, h_1$ have periodicities $\bar{m}$ and $\bar{r}$ respectively, if these periodicities are coprime then they guarantee injectivity when the domain size $\bar{u} \leq \overline{mr}$, or equivalently when the data density $\sigma = n/u \geq 1/r$. In practice, r is typically large enough that this is always true, and thus one need not test for injectivity explicitly.

Exemplary Creation of Offset Table

FIG. 4 illustrates the effect on the hash function of changing one offset value in the offset table. FIG. 4 illustrates a hash function environment 400 having a spatial domain 402, a hash table 404, and an offset table 406. On average, each entry q of the offset table 406 is the image through $h_1$ of $\sigma^{-1} = n/r \cong 4$ data points—namely the set $h_1^{-1}(q) \subset S$. The assignment of the offset vector $\Phi[q]$ determines a uniform translation of these points within the hash table 404. One goal is to find an assignment that does not collide with other points hashed in the table 404.

The entries $\Phi[q]$ with the largest sets $h_1^{-1}(q)$ of dependent data points are desirably processed first. The exemplary algorithm assigns offset values greedily according to this heuristic order (e.g., computed efficiently using a bucket sort). For each entry q, a search for an offset value $\Phi[q]$ is made such that the data entries $h_1^{-1}(q)$ do not collide with any data previously assigned in the hash table 404, e.g., $$\forall p \in h_1^{-1}(q), H[h_0(p) + \Phi[q]] = \text{undef}.$$

The space of 8-bit-quantized offset values is $\mathbb{Z}_{min(\bar{m}, 256)}^d \lceil \bar{m}/255 \rceil$. Note that towards the end of construction, the offset entries considered are those with exactly one dependent point, such as $|h_1^{-1}(q)| = 1$. For these cases, the exemplary algorithm finds offset values that direct these sole points to open hash slots.

Exemplary Optimization of Hash Coherence

Because $M_1$ is assigned to be the identity matrix in the example, accesses to the offset table $\Phi$ are coherent. How hash construction is modified to increase coherence of access to H is described next.

First, one considers the case that hash queries are constrained to the set of defined entries $S \subset U$. Let $N_S(p_1, p_2)$ be 1 if two defined points $p_1, p_2 \in S$ are spatially adjacent in the domain (i.e. $\|p_1 - p_2\| = 1$), or 0 otherwise. And, let $N_H(s_1, s_2)$ be similarly defined for slots in tables H. One seeks to maximize $$\mathcal{N}_H = \sum_{p_1, p_2 | N_S(p_1, p_2) = 1} N_H(h(p_1), h(p_2))$$
$$= \sum_{p_1, p_2 | N_H(h(p_1), h(p_2)) = 1} N_S(p_1, p_2).$$

It is this latter expression that is measured during construction. When assigning an offset value $\Phi[q]$, rather than selecting any value that is valid, one seeks one that maximizes coherence. Specifically, one examines the slots of H into which the points $h_1^{-1}(q)$ map, and counts how many neighbors in H are also neighbors in the spatial domain:

$$\max_{\Phi[q]} C(\Phi[q]), C(\Phi[q]) = \sum_{p \in h_1^{-1}(q), \|\Delta\| = 1} N_S(h^{-1}(h_0(p) + \Phi[q] + \Delta), p).$$

The following heuristic candidates are considered:

(1) In the example, one tries setting the offset value equal to one stored in a neighboring entry of the offset table, because the hash function is coherent if the offset table is locally constant:

$$\Phi[q] \in \{\Phi[q'] | \|q - q'\| < 2\}.$$

(2) For each point $p \in h_1^{-1}(q)$ associated with q, one examines its domain-neighboring entries $p' \in S$. If a neighbor p' is already assigned in the table H, one looks to see if any neighboring slot in H is free, and if so, tries the offset that would place p in that free slot:

$$\Phi[q] \in \{h(p') + \Delta - h_0(p) | p \in h_1^{-1}(q), p' \in S, N_S(p, p') = 1, h(p') \neq \text{undef}, \|\Delta\| = 1, H[h(p') + \Delta] = \text{undef}\}.$$

In the case that hash queries can span the full domain U, then local constancy of $\Phi$ is most important and one would give preference to the candidates found in (1) above.

As a postprocess, any undefined offset entries (i.e. for which $h_1^{-1}(q) = \emptyset$) are assigned values coherent with their neighbors. Table 2 (below) shows obtained values for the normalized coherence metric $\bar{N}_H = N_H / \Sigma_{p_1, p_2} N_S(p_1, p_2)$.

Exemplary Sparsity Encoding

The hash table generally stores data associated with a sparse subset of the domain. Depending on the application, it may be necessary to determine if an arbitrary query point lies in this defined subset.

Exemplary Constrained Access

Some scenarios such as 3D-parameterized surface textures guarantee that only the defined subset of the domain will ever be accessed.

Exemplary Domain Bit

For scenarios involving unconstrained access, one approach is to store a binary image over the domain, where each pixel (bit) indicates the presence of data (or blocks of data) in the hashed texture. One benefit is that a dynamic branch can be performed in the shader based on the stored bit, to completely bypass the hash function evaluations ($h_0, h_1$) and texture reads ($\Phi, H$) on the undefined pixels.

Since current graphics hardware lacks support for single-bit textures, one approach involves packing each 4×2 block of domain bits into one pixel of an 8-bit luminance image. To dereference the bit, we perform a lookup in a 4×2×256 texture.

If a non-sparse image is already defined over the domain, another exemplary strategy is to hide the domain bit within this image, such as in the least-significant bit of a color or alpha channel. Such a hidden bit is convenient to indicate the presence of sparse supplemental data beyond that in the normal image.

Exemplary Position Tag

When the data is very sparse, storing even a single bit per domain point may take significant memory. Another approach is to let each slot of the hash table include a tag identifying the domain position $\hat{p}$ of the stored data. Given a query point, one can then simply compare it with the stored tag.

Encoding a position $\hat{p} \in U$ requires a minimum of $\log_2 u$ bits. The position tags can be stored in an image with d channels of 16 bits, thus allowing a domain grid resolution of $\bar{u}=64K$. Such position tags are more concise than a domain bit image if $d \cdot 16 \cdot m < 1 \cdot u$ or equivalently if the data density $n/u < 1/(16d)$.

Exemplary Parameterized Position Hash

The set $h^{-1}(s) \subset U$ of domain points mapping to a slot s of the hash table has average size $u/n$. One goal is to encode which one is the defined point $\hat{p} \in S$. One solution is to store in each slot a tuple $(k, h_k(\hat{p}))$, where the integer $k \in \{1, \ldots, K\}$ locally selects a parameterized hash function $h_k(p)$ such that the defined point $\hat{p}$ has a hash value $h_k(\hat{p}) \in \{1, \ldots, R\}$ different from that of all other all domain points mapping to that slot. More precisely, $$\forall p \in h^{-1}(s) \setminus \hat{p}, \; h_k(p) \neq h_k(\hat{p}) \quad (1)$$

The assignment of tuples $(k, h_k(\hat{p}))$ can proceed after hash construction as follows. One first assigns k=1 and computes $h_k(\hat{p})$ at all slots. For the few slots without a defined point $\hat{p}$, one can assign $h_k(\hat{p})=1$. One can then sweep through the full domain U to find the undefined points whose parameterized hash values (under k=1) conflict with $h_k(\hat{p})$, and mark those slots. One can then make a second sweep through the domain to accumulate the sets $h^{-1}(s)$ for those slots with conflicts. Finally, for each such slot, one can try all values of k to satisfy (1).

Unlike the exemplary perfect hash function h, one can let $h_k(p)$ be as random as possible since it is not used to dereference memory. For fast evaluation, one can use hk=frac(dot(p, rsqrt(p+k*cl))), set K=R=256, and store $(k, h_k(\hat{p}))$ as a 2-channel 8-bit image.

Exemplary Hybrid Scheme

Another approach is to combine the domain bit and position hash techniques. One can store a domain bit image at coarse resolution to efficiently discard blocks of undefined pixels. When this test fails, one can access the table and use the stored position hash to determine if the queried entry is defined.

Exemplary Filtering and Blocking

Sparse data Dip) can represent either constant attributes over discrete grid cells (e.g., sprite pointers, line coefficients, or voxel occupancy) or samples of a smooth underlying function (e.g., color or transparency). In this second case, one seeks to evaluate a continuous reconstruction filter.

Exemplary Filtering With Blocking

One approach is to enable native hardware bilinear/trilinear filtering by grouping pixels into blocks. An original domain of size $w=\bar{w}^d$ can be partitioned into a grid of $\bar{u}^d = (\bar{w}/b)^d$ sample-bordered blocks of extent $b^d$. Each block stores $(b+1)^d$ samples since data is replicated at the block boundaries. If n blocks contain defined data, these pack into a texture of size $n(b+1)^d$. To reference the packed blocks, previous schemes use an indirection table with u pointers, for a total of 16u-24u bits. All but n of the pointers reference a special empty block. The block size that minimizes memory use is data-dependent, and is determined through a simple search.

The disclosed technology replaces the indirection table with a hash function, which needs only ~4 bits per defined block. In addition, for the case of 2D unconstrained access, one must encode the defined blocks using either a domain bit or position hash, for a total of 4n+u or 20n bits respectively.

TABLE 1

| Block size | Blocks | | | Memory size (KB) | | | | |
|---|---|---|---|---|---|---|---|---|
| | | | | Indirection table | Spatial hash | offset | dom. | pos. |
| b | n | Density | (KB) | total | total | $\Phi$ | bit | hash |
| unblocked | 11,868 | 3.7% | 11.9 | — | 30.7 | 6.9 | — | 23.8 |
| $1^2$ | 8,891 | 2.8% | 35.6 | 676.3 | 120.1 | 4.4 | 80.1 | — |
| $2^2$ | 2,930 | 3.7% | 26.4 | 186.5 | 48.0 | 1.5 | 20.2 | — |
| $3^2$ | 1,658 | 4.6% | 26.5 | 98.0 | 36.7 | 1.2 | 9.0 | — |
| $4^2$ | 1,107 | 5.5% | 27.7 | 68.0 | 33.4 | 0.6 | 5.0 | — |
| $5^2$ | 817 | 6.3% | 29.4 | 55.4 | 33.2 | 0.5 | 3.2 | — |

TABLE 1-continued

| Block size | Blocks | | | Memory size (KB) | | | | |
| --- | --- | --- | --- | --- | --- | --- | --- | --- |
| | | | | Indirection table | Spatial hash | offset | dom. | pos. |
| b | n | Density | (KB) | total | total | Φ | bit | hash |
| $6^2$ | 655 | 7.3% | 32.1 | 50.1 | 34.8 | 0.4 | 2.3 | — |
| $7^2$ | 532 | 8.1% | 34.0 | 47.2 | 36.1 | 0.3 | 1.7 | — |
| $8^2$ | 460 | 9.1% | 37.3 | 47.3 | 38.8 | 0.3 | 1.3 | — |
| $9^2$ | 392 | 9.9% | 39.2 | 47.1 | 40.5 | 0.2 | 1.0 | — |
| $10^2$ | 339 | 10.4% | 41.0 | 47.5 | 42.1 | 0.2 | 0.8 | — |
| unblocked | 4,500 K | 0.4% | 13,723 | — | 15,698 | 1,976 | — | — |
| $1^3$ | 2,266 K | 0.2% | 54,396 | 3,275,622 | 55,382 | 986 | — | — |
| $2^3$ | 563 K | 0.4% | 45,596 | 448,249 | 45,869 | 273 | — | — |
| $3^3$ | 250 K | 0.6% | 47,952 | 167,958 | 48,104 | 152 | — | — |
| $4^3$ | 140 K | 0.8% | 52,561 | 102,892 | 52,650 | 89 | — | — |
| $5^3$ | 89 K | 1.0% | 57,952 | 83,797 | 58,005 | 53 | — | — |
| $6^3$ | 62 K | 1.2% | 63,873 | 78,874 | 63,910 | 37 | — | — |
| $7^3$ | 46 K | 1.4% | 69,955 | 79,485 | 69,983 | 28 | — | — |

Table 1 shows quantitative comparisons of indirection tables and domain-bit hashes for various block sizes. As can be seen from the table, the hash offset table is much more compact than the indirection table and therefore encourages smaller block sizes.

The following is exemplary HLSL pseudocode for block-based spatial hashing:

```
float4 BlockedHashedTexture(point pf) {
    // pf is prescaled into range [0,ū]
    point fr = frac(pf);
    point p = pf – fr;              // == floor(pf)
    if (use_domain_bit && !DecodeDomainBit(p))
        return undef color;
    point h = ComputeHash(p);
    if (use_position_hash && !PositionMatchesHash(p,h))
        return undef color;
    return tex(SHData, h + fr * bscale);
}
```

Exemplary Filtering Without Blocking

To remove the overhead of sample replication, another exemplary approach performs explicit (e.g., non-native) filtering on an unblocked representation. The shader retrieves the nearest $2^d$ samples from the hashed data and blends them.

As shown in the first row of Table 1, in 3D where access is constrained, memory use is reduced by an impressive factor of 3. The unblocked hashed texture is only 16% larger than the defined data values.

Exemplary Mipmapping

Defining a traditional mipmap pyramid over the packed data creates filtering artifacts even in the presence of blocking because the coarser mipmap levels incorrectly blend data across blocks. One solution is as follows. One computes a correct mipmap over the domain and arranges all mipmap levels into a flattened, broader domain using a simple function. Then, one constructs a spatial hash on this new flattened domain (either with or without blocking). At runtime, one determines the mipmap LOD using one texture lookup, performs separate hash queries on the two nearest mipmap levels, and blends the retrieved colors.

Native hardware mipmap filtering would be possible by assigning two mipmap levels to the packed texture. However, correct filtering would require allocating $(b+3)^d$ samples to each block (where b is odd) so it would incur a significant overhead. For instance, blocks of size b=5 in 2D would need $(5+3)^2+(3+1)^2=80$ samples rather than $(5+1)^2=36$ samples.

Exemplary 2D Domains

Exemplary Images with Discontinuities

Several schemes embed discontinuities in an image by storing vector information at its pixels. These schemes allocate vector data at all pixels even though discontinuities are usually sparse. They reduce memory use through coarse quantization and somewhat intricate encodings. Spatial hashing offers a simple, compact solution useful in conjunction with any such scheme—whether vector data is implicit or parametric, linear or higher-order, and with or without corners.

To demonstrate the feasibility and performance of the hash approach, one can implement a representation of binary images with piecewise linear boundaries. For each square cell of the domain image, one can store two bits $b_1,b_2$. Bit $b_1$ is the primary color of the cell, and bit $b_2$ indicates if any boundary lines pass through the cell. If $b_2=1$, the shader accesses a hashed texture to retrieve the coefficients $a_i,b_i,c_i$, i=1,2 of two oriented lines passing through the cell, $l_i(x,y)=a_ix+b_iy+c$, where x,y are cell-local coordinates. The binary color at (x,y) is simply defined as $$b_1 \text{ xor } (l_1(x,y) > 0 \hat{} l_2(x,y) > 0).$$

Figure 5:
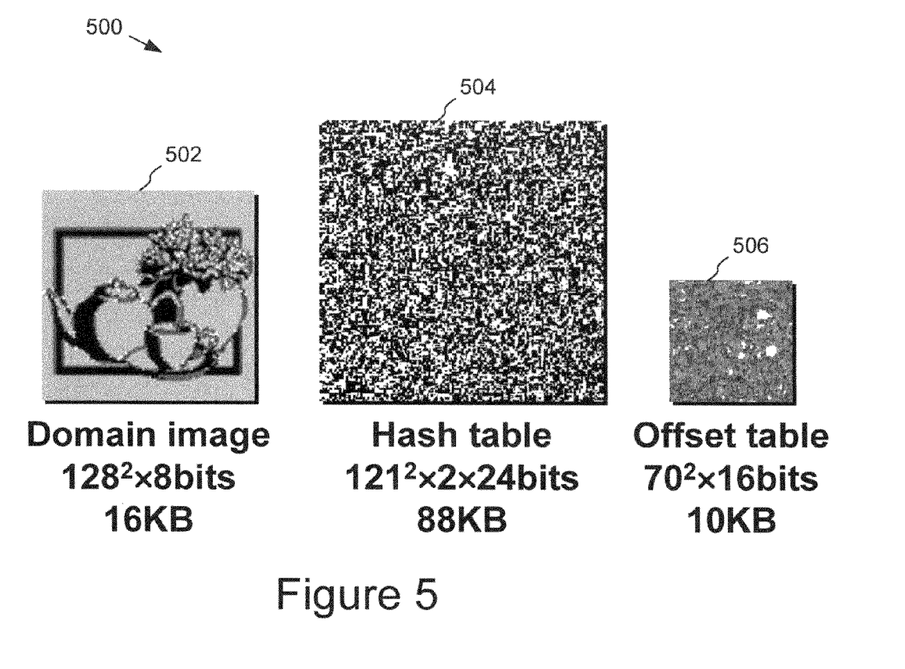
FIG. 5 illustrates a hash function environment including a domain image, a hash table, and an offset table.

One can pack the 2 bits per pixel of the domain image as 2×2 blocks into individual pixels of an 8-bit image, and pack the hashed set of line coefficients as two RGB 8-bit images. FIG. 5 illustrates a hash function environment 500. In the example, given a $256^2$ vector data image of 393 KB, one creates a $128^2$ domain image 502 of 16 KB, a hash table 504 of 88 KB, and an offset table 506 of 10 KB, for a total of 114 KB, or 14 bits/pixel.

One can implement antialiasing. The complete shader, including hashing, takes 40 instructions. One benefit of is that dynamic branching on the domain bit $b_2$ lets the shader run extremely quickly on pixels away from the boundaries. For those pixels near discontinuities, the shader makes a total of 5 texture reads: the packed domain bit, an unpacking decode table, the hash offset value, and two triples of line coefficients. The image in FIG. 5 renders at 461 Mpix/sec (i.e., 720 frames/sec at $800^2$ resolution).

Exemplary Texture Sprites

Sprites are generally high-resolution decals instanced over a domain using texture indirection. For example, they can be used to place character glyphs on a page. Spatial hashing can be used to compactly store such sprite maps.

Exemplary Alpha Channel Compression

In images with alpha masks, most alpha values are either 0 or 1, and only a small remaining subset is fractional. One may pack this sparse subset in a hashed texture, which is blocked to support native bilinear filtering.

In one example, an R5G5B5A1 image is used where the one-bit alpha channel is 1 to indicate full opacity, the color (0,0,0,0) is reserved for full transparency, or else the fractional alpha value is placed in the spatial hash. Storage for the alpha channel can be reduced from 8 to 1.7 bits per pixel (including the 1 bit alpha channel). Rendering rate is about 1170 frames/sec. The following is exemplary HLSL pseudocode:

```
float4 AlphaCompressedTexture(float2 p) : COLOR {    float4 pix =
tex2D(STexture, p); // R5G5B5A1
   if (pix.a == 1) {                        // fully opaque pixel, no-op
   } else if (!any(pix)) { // fully transparent pixel, no-op } else {
      // fractional alpha in hash table
      pix.a = BlockedHashedTexture(p*scale);
   }
   // optimized: if (dot(1-pix.a,pix.rg.b)) pix.a = Blocked . . .
   return pix;
}
```

For traditional R8G8B8 images, an alternative is to use a coarse 2-bit domain image at the same resolution as the hashed alpha blocks, yielding overall alpha storage of 0.92 bits per pixel and a rendering rate of 830 frames/sec.

Exemplary 3D domains

Exemplary 3D-Parameterized Surface Texture.

Octree textures generally store surface color as sparse volumetric data parameterized by the intrinsic surface geometry. Such volumetric textures offer a simple solution for seamless texturing with nicely distributed spatial samples.

Perfect hashing provides an efficient packed representation. One can use a block-based hash for native trilinear filtering.

The disclosed technology involves storing data at a spatially uniform resolution. One could support adaptive resolution by introducing a mipmapped indirection table with sharing of blocks between levels as in. Spatial hashing could then be used to compress this mipmapped indirection table.

Exemplary 3D Painting

A 3D hashed texture is usually well-suited for interactive painting, because it is compact enough to uniformly sample a surface at high resolution yet efficient enough for real-time display and modification. One advantage over adaptive schemes such as octrees is that, just as in traditional 2D painting, one need not update any pointer-based structures during interaction.

Current graphics systems do not allow efficient rendering into a 3D texture. Thus, to enable fast modification of the hashed data on current systems, the disclosed technology extends its hash function to map 3D domains to 2D textures. This involves redefining $M_0, M_1$ as 2×3 matrices of the form $$\begin{pmatrix} 1 & 0 & c_1 \\ 0 & 1 & c_2 \end{pmatrix},$$

where $C_1, C_2$ are coprime with both $\overline{m}$ and $\overline{r}$.

Position tags are stored along with the hashed data. Then, during painting, rasterization passes are performed over the 2D hashed texture. For each pixel, the shader compares the paintbrush position with the stored position tag and updates the hashed color appropriately. After painting is complete, the hashed 2D data could be transferred to a block-based 3D hash or to a conventional texture atlas.

Figure 6:
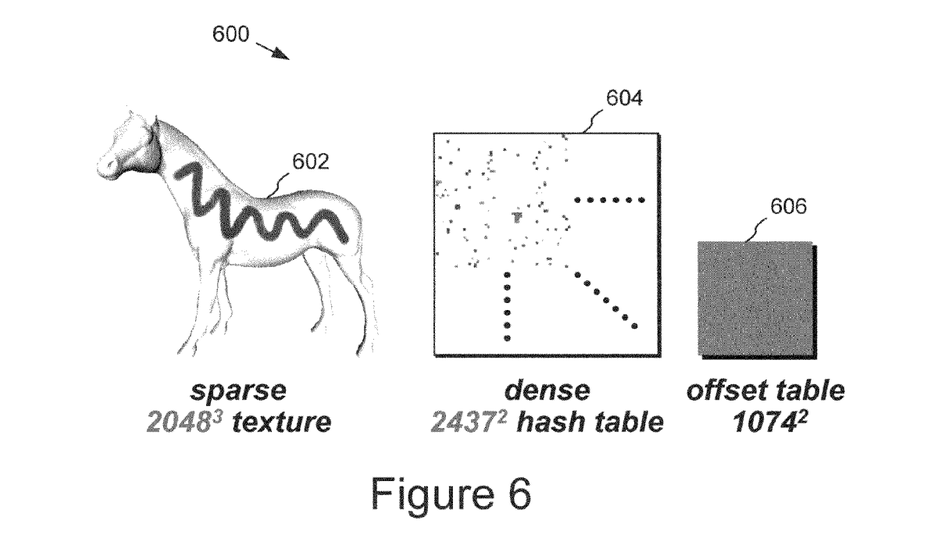
FIG. 6 illustrates a 3D painting example involving a volumetric texture, a hash texture, and an offset table.

FIG. 6 illustrates a 3D painting example 600 in which a $2048^3$ volumetric texture 602 is hashed into a $2437^2$ image 604. The hashed texture takes 17.8 MB, the position tags 35.6 MB, and the $1074^2$ offset table 606 2.3 MB, for a total of 55.7 MB. Painting can proceed at a remarkable rate of 190 frames/sec. Since the full hashed data is modified in each frame, the paintbrush can be any image of arbitrary size without any loss in performance.

Exemplary 3D Simulation

One can also let a finite-element simulation modify the surface data, again as a rasterization pass over the 2D hash table. Here the elements are voxels intersecting the surface. For each element one stores 2D pointers to the 3D-adjacent elements (some of which may be undefined).

Exemplary Surface Collision Detection

A spatial hash enables an efficient object-space framework for conservative collision detection—one can discretize two surfaces $S_A, S_B$ into voxels and intersect these. Let $\text{Vox}_g(S)$ be the sparse voxels of size g that intersect surface S. Rather than directly computing $\text{Vox}_g(S_A) \cap \text{Vox}_g(S_B)$, the voxel centers of one surface are tested against a dilated version of the voxels from the other surface. That is, $\text{Vox}_g(S_A+S_e) \cap \text{Centers}(\text{Vox}_g(S_B))$ is computed where "+" denotes Minkowski sum, $S_e$ is a sphere of voxel circumradius $e=g\sqrt{3}/2$, and Centers returns the voxel centers.

The sparse voxels $\text{Vox}_g(S_A+S_e)$ are stored as a blocked spatial hash, and the points $\text{Centers}(\text{Vox}_g(S_B))$ as a 2D image. At runtime, given a rigid motion of $S_B$, a rasterization pass is applied over its stored voxel centers. The shader transforms each center and tests if it lies within a defined voxel of the spatial hash of $S_A$. The intersecting voxels of $S_B$ provide a tight conservative approximation of the intersection curve. In addition to using a traditional occlusion query, one can render the intersecting voxels by letting the 2D image of $S_B$ be defined as a second (3D→2D) spatial hash.

Exemplary Applications

Table 2 summarizes quantitative results for spatial hashing in various applications. The bits per entry required by the offset table assume 8-bit offset coordinates. Also included is the theoretical bit rate if one were allowed coordinates with $\lceil \log_2 \overline{m} \rceil$ bits.

TABLE 2

| Application | Dataset | Block size b | Domain grid u | Defined data n | Data density n/u | Hash table m | Offset table r | Offset table bits/n Theor. | Offset table bits/n 8-bit Φ |
|---|---|---|---|---|---|---|---|---|---|
| Vector image | teapot | — | $256^2$ | 14,509 | 22.1% | $121^2$ | $70^2$ | 4.73 | 5.40 |
| Vector image | font | — | $1024^2$ | 35,237 | 3.4% | $188^2$ | $124^2$ | 6.98 | 6.98 |
| Vector image | tree | — | $512^2$ | 32,718 | 12.5% | $181^2$ | $101^2$ | 4.99 | 4.99 |
| Sprites | text | — | $512^2$ | 96,174 | 36.7% | $313^2$ | $200^2$ | 6.65 | 6.65 |
| Alpha compr. | boy | 3 | $189^2$ | 1,658 | 4.6% | $41^2$ | $24^2$ | 4.17 | 5.66 |
| 3D texture | armadillo | 2 | $512^2$ | 562,912 | 0.4% | $83^3$ | $45^3$ | 3.40 | 3.89 |
| Painting | Horse | — | $2048^3$ | 5.9 M | 0.07% | $2437^2$ | $1074^2$ | 3.15 | 3.15 |
| Simulation | Car | — | $256^3$ | 142,829 | 0.9% | $381^2$ | $170^2$ | 3.24 | 3.24 |
| Collision det. | gargoyle | 6 | $171^3$ | 94,912 | 1.9% | $46^3$ | $26^3$ | 3.33 | 4.44 |
| — | random | — | $2048^2$ | 100,000 | 2.4% | $318^2$ | $136^2$ | 2.96 | 2.96 |
| — | random | — | $512^3$ | 1.0 M | 0.7% | $101^3$ | $52^3$ | 2.95 | 3.37 |

| Application | Dataset | Construction (sec) Fast | Construction (sec) Opt. r | Runtime (frames/sec) dep. on hash coherence No coh. | Runtime (frames/sec) dep. on hash coherence No opt. | Runtime (frames/sec) dep. on hash coherence Opt. | Opt. coh. $\bar{N}_H$ | Num. GPU instr. |
|---|---|---|---|---|---|---|---|---|
| Vector image | teapot | 0.2 | 0.9 | 694 | 725 | 729 | .324 | 40 |
| Vector image | font | 0.8 | 2.3 | 636 | 665 | 689 | .303 | 40 |
| Vector image | tree | 0.5 | 2.0 | 675 | 727 | 760 | .288 | 40 |
| Sprites | text | 4.5 | 7.9 | 208 | 237 | 272 | .419 | 121 |
| Alpha compr. | boy | 0.0 | 0.0 | 1147 | 1172 | 1169 | .290 | 23 |
| 3D texture | armadillo | 7.0 | 350 | 439 | 536 | 540 | .113 | 9 |
| Painting | Horse | 27.7 | 1400 | 270 | 354 | 403 | .055 | 10 |
| Simulation | Car | 1.7 | 15 | 1221 | 1478 | 1527 | .093 | 11 |
| Collision det. | gargoyle | 0.6 | 14 | 127 | 134 | 143 | .153 | 38 |
| — | random | 0.2 | 20 | — | — | — | — | — |
| — | random | 6.0 | 830 | — | — | — | — | — |

The two preprocess times are for fast construction and for binary search optimization over the offset table size. (All other results assume optimized table sizes.) Runtime rendering performance is compared on perfect hashes constructed using (1) random matrices $M_0, M_1$ to simulate pseudorandom noncoherent hash functions, (2) identity matrices $M_0, M_1$ but no coherence optimization, and finally (3) coherence optimization. The optimization finds coherence as reflected in the metric $\bar{N}_H$. The last column shows shader complexity as number of assembly instructions.

Exemplary Computing Environment

Figure 7:
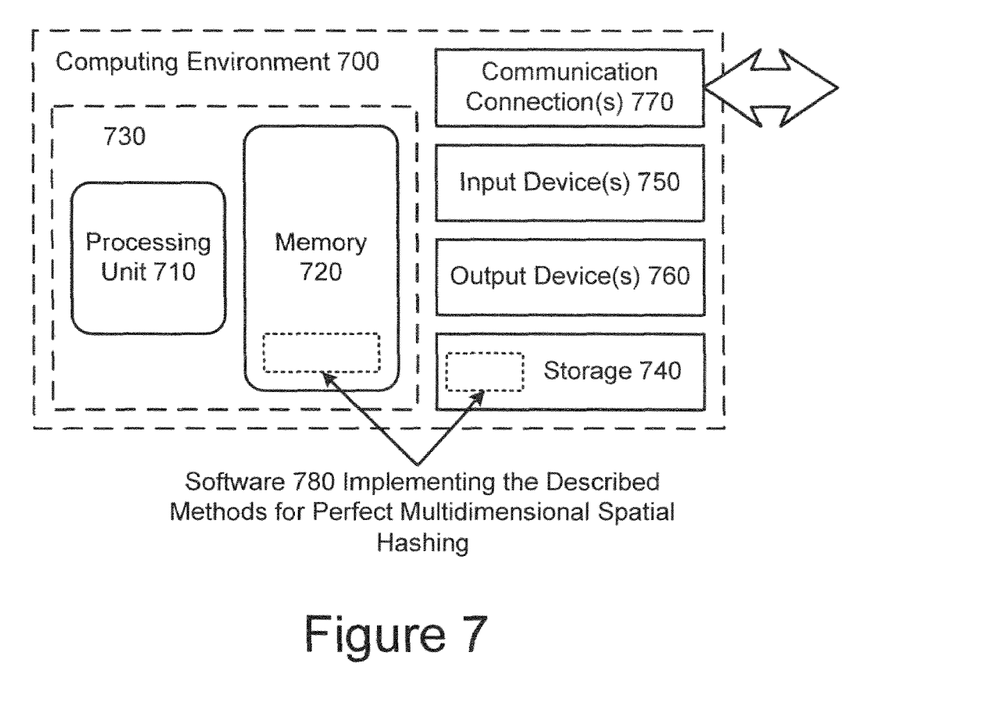
FIG. 7 is a block diagram illustrating an exemplary computing environment for implementing the disclosed technology.

FIG. 7 and the following discussion are intended to provide a brief, general description of an exemplary computing environment in which the disclosed technology may be implemented. Although not required, the disclosed technology was described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

FIG. 7 illustrates a generalized example of a suitable computing environment 700 in which described embodiments may be implemented. The computing environment 700 is not intended to suggest any limitation as to scope of use or functionality of the technology, as the present technology may be implemented in diverse general-purpose or special-purpose computing environments.

With reference to FIG. 7, the computing environment 700 includes at least one central processing unit 710 and memory 720. In FIG. 7, this most basic configuration 730 is included within a dashed line. The central processing unit 710 executes computer-executable instructions and may be a real or a virtual processor. In a multi-processing system, multiple processing units execute computer-executable instructions to increase processing power and as such, multiple processors can be running simultaneously. The memory 720 may be volatile memory (e.g., registers, cache, RAM), non-volatile memory (e.g., ROM, EEPROM, flash memory, etc.), or some combination of the two. The memory 720 stores software 780 implementing the described methods for perfect multidimensional spatial hashing. A computing environment may have additional features. For example, the computing environment 700 includes storage 740, one or more input devices 750, one or more output devices 760, and one or more communication connections 770. An interconnection mechanism (not shown) such as a bus, a controller, or a network, interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which can be used to store information and which can be accessed within the computing environment 700. The storage 740 stores instructions for the software 780 implementing the described methods for perfect multidimensional spatial hashing.

The input device(s) 750 may be a touch input device, such as a keyboard, mouse, pen, or trackball, a voice input device, a scanning device, or another device, that provides input to the computing environment 700. For audio, the input device(s)

750 may be a sound card or similar device that accepts audio input in analog or digital form, or a CD-ROM reader that provides audio samples to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, compressed graphics information, or other data in a modulated data signal.

Computer-readable media are any available media that can be accessed within a computing environment 700. By way of example, and not limitation, with the computing environment 700, computer-readable media include memory 720, storage 740, and combinations of any of the above.

In view of the many possible embodiments to which the principles of the disclosed technology may be applied, it should be recognized that the illustrated embodiments are only preferred examples of the technology and should not be taken as limiting the scope of the following claims. We, therefore, claim as our invention all that comes within the scope and spirit of these claims.

We claim:

1. A method performed by a computer having a processor and a memory for efficiently accessing sparse spatial data by its position in a multidimensional space, the method comprising:
   storing a hash table by the processor in a memory of the computer containing the sparse spatial data in densely packed form;
   storing a set of offset values in an offset table by the processor in the memory of the computer, wherein the offset values map the positions of the sparse spatial data in the multidimensional space to a hash index of the densely packed sparse spatial data's location in the hash table according to a perfect hash function formed as a sum modulo of a size of the hash table of a first hash function of the positions plus an offset value obtained from the offset table indexed by a second hash function of the positions, where the first hash function and second hash functions are calculated using identity matrix transforms of the positions to provide coherent data access from the positions to the sparse spatial data in the hash table; and
   accessing the sparse spatial data by the processor from the hash table in the memory according to the perfect hash function of the sparse spatial data's positions within the multidimensional space.

2. The method of claim 1, wherein the sparse multidimensional data comprises sparse two-dimensional data.

3. The method of claim 1, wherein the sparse multidimensional data comprises sparse three-dimensional data.

4. The method of claim 1, wherein storing a hash table comprises creating as compact a hash table as possible to contain the sparse multidimensional data.

5. The method of claim 1, wherein said accessing the sparse spatial data by the processor from the hash table in the memory according to the perfect hash function comprises adapting a heuristic ordering strategy to optimize data coherence.

6. The method of claim 1, wherein said storing a set of offset values in the offset table comprises creating the offset table to be as compact as possible while still permitting application of a perfect hash function.

7. The method of claim 1, wherein said storing a set of offset values in the offset table comprises:
   setting the offset table size to an initial size; and
   if a hash construction fails, successively increasing the offset table size until construction succeeds.

8. The method of claim 1, wherein said storing a set of offset values in the offset table comprises performing a binary search over the offset table size.

9. The method of claim 1, wherein the offset table comprises a square and the hash table comprises a square.

10. The method of claim 1, wherein the offset table comprises a cube and the hash table comprises a square.

11. The method of claim 1, wherein applying a perfect hash function comprises applying a minimal perfect hash function.

12. A computer system for providing efficient storage and access to sparse spatial data at positions in a multidimensional space, the computer system comprising:
   a memory for storing:
      a compact hash table having a geometric shape, the compact hash table capable of receiving the sparse spatial data in a packed format; and
      a compact offset table having a geometric shape substantially similar to the geometric shape of the compact hash table, the compact offset table containing offset values for mapping the positions to indices of the sparse spatial data in the compact hash table according to a perfect hashing function formed as a sum modulo of a size of the compact hash table of a first hash function of the positions plus an offset value obtained from the offset table indexed by a second hash function of the positions, where the first hash function and second hash functions are calculated using identity matrix transforms of the positions to provide coherent data access from the positions to the offset values in the compact offset table and to the sparse spatial data in the compact hash table; and
   a processing unit for accessing the sparse spatial data from the compact hash table in the memory according to the perfect hashing function of the sparse spatial data's position in the multidimensional space.

13. One or more computer-readable storage media containing instructions which, when executed by a computer, cause the computer to perform a method of three-dimensional painting, the method comprising:
   creating a hashing function on a three-dimensional domain to map three-dimensional data into a hash table using offset values in an offset table, where the hashing function is formed as a sum modulo of a size of the hash table of a first hash function plus an offset value obtained from the offset table indexed by a second hash function, where the first hash function and second hash functions are calculated using identity matrix transforms to provide coherent data access into the offset table and the hash table;
   storing a plurality of position tags corresponding to the three-dimensional data mapped into the hash table;
   comparing a paintbrush position with one of the plurality of position tags; and
   updating the three-dimensional data mapped into the hash table based on the comparing.

14. The one or more computer-readable media of claim 13, wherein the hashing function comprises a perfect hashing function.

15. The one or more computer-readable media of claim 13, wherein the hash table is a two-dimensional hash table.

16. The one or more computer-readable media of claim 13, wherein the comparing and updating comprise performing one or more rasterization passes over the hash table data.

17. The one or more computer-readable media of claim 13, wherein the method further comprises transferring the hash table content to a conventional texture atlas representation.

18. The one or more computer-readable media of claim 13, wherein the method further comprises transferring the two-dimensional texture to a conventional texture atlas.

* * * * *

UNITED STATES PATENT AND TRADEMARK OFFICE
CERTIFICATE OF CORRECTION

PATENT NO. : 7,619,623 B2
APPLICATION NO. : 11/405953
DATED : November 17, 2009
INVENTOR(S) : Hoppe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 588 days.

Signed and Sealed this

Twenty-sixth Day of October, 2010

David J. Kappos
*Director of the United States Patent and Trademark Office*